United States Patent
Tsai et al.

(10) Patent No.: US 8,332,607 B2
(45) Date of Patent: Dec. 11, 2012

(54) NON-VOLATILE MEMORY STORAGE DEVICE AND OPERATION METHOD THEREOF

(75) Inventors: Chih Wei Tsai, Hsinchu (TW); Chuang Cheng, Hsinchu (TW); Yung Li Ji, Hsinchu (TW); Shih Chieh Tai, Hsinchu (TW); Chih Cheng Tu, Hsinchu (TW); Fuja Shone, Hsinchu (TW)

(73) Assignee: Skymedi Corporation, Hsinchu (TW)

( * ) Notice: Subject to any disclaimer, the term of this patent is extended or adjusted under 35 U.S.C. 154(b) by 706 days.

(21) Appl. No.: 12/183,229

(22) Filed: Jul. 31, 2008

(65) Prior Publication Data

US 2010/0030933 A1    Feb. 4, 2010

(51) Int. Cl.
*G06F 12/00* (2006.01)
*G06F 13/00* (2006.01)
*G06F 13/28* (2006.01)

(52) U.S. Cl. .... 711/168; 711/157; 711/103; 365/230.01
(58) Field of Classification Search .................. 711/103, 711/157, 168; 365/230.01
See application file for complete search history.

(56) References Cited

U.S. PATENT DOCUMENTS

| | | | | |
|---|---|---|---|---|
| 5,511,182 A | * | 4/1996 | Le et al. | 713/600 |
| 7,126,873 B2 | * | 10/2006 | See et al. | 365/230.06 |
| 7,782,682 B2 | * | 8/2010 | Matsuzaki et al. | 365/189.17 |
| 2001/0036121 A1 | * | 11/2001 | Nicosia et al. | 365/233 |

* cited by examiner

*Primary Examiner* — Stephen Elmore
*Assistant Examiner* — Mark Giardino, Jr.
(74) *Attorney, Agent, or Firm* — WPAT, P.C.; Anthony King (57) ABSTRACT

A non-volatile memory storage device has a non-volatile memory, e.g., a flash memory, and a controller coupled to the non-volatile memory. The controller comprises a plurality of control circuits and an arbitration circuit. Each control circuit is configured to generate a request to update the chip-enable (CE) signals for non-volatile memory, and the arbitration circuit is configured to determine when the requests are acknowledged. The arbitration circuit generates acknowledge signals to the control circuits when all of the requests of the control circuits have been received by the arbitration circuit. The CE signals for non-volatile memory are updated when requests are acknowledged.

12 Claims, 15 Drawing Sheets

NON-VOLATILE MEMORY STORAGE DEVICE AND OPERATION METHOD THEREOF

BACKGROUND OF THE INVENTION (A) Field of the Invention

The present invention relates to a memory storage device and method for operating the same. More specifically, the present invention relates to a non-volatile memory storage device and method for operating the same.

(B) Description of Related Art

Figure 1:
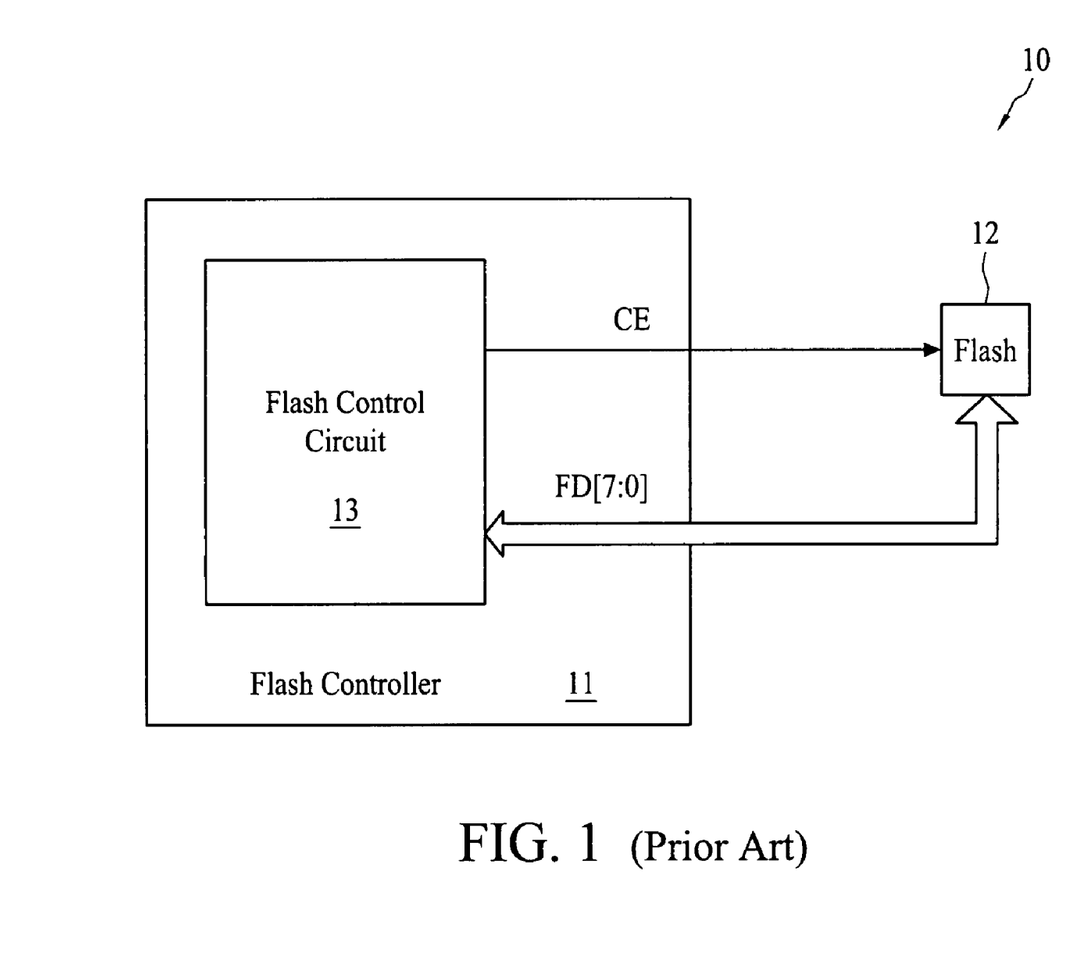
FIGS. 1 to 4 illustrate known flash memory storage devices.

FIG. 1 illustrates an 8-bit flash memory storage device 10 including a flash controller 11 and a flash memory 12. The flash controller 11 has a flash control circuit 13 which can issue a chip-enable (CE) signal to access the flash memory 12. An 8-bit flash data bus FD[7:0] is connected between the flash control circuit 13 and the flash memory 12.

Figure 2:
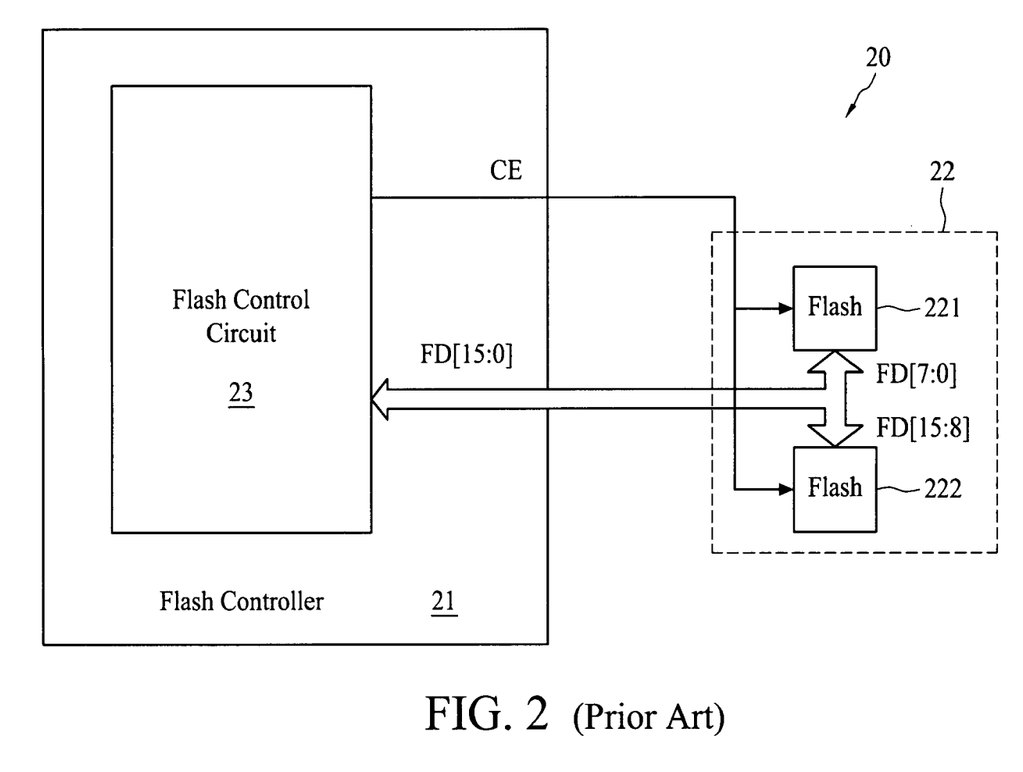

FIG. 2 illustrates a 16-bit flash memory storage device 20 including a flash controller 21 and a flash memory 22. The flash memory 22 has two flash memory chips 221 and 222. The flash controller 21 has a flash control circuit 23 that can issue a CE signal to access the flash memory chips 221 and 222. A 16-bit flash data bus FD[15:0] is connected between the flash control circuit 23 and the flash memory chips 221 and 222.

Figure 3:
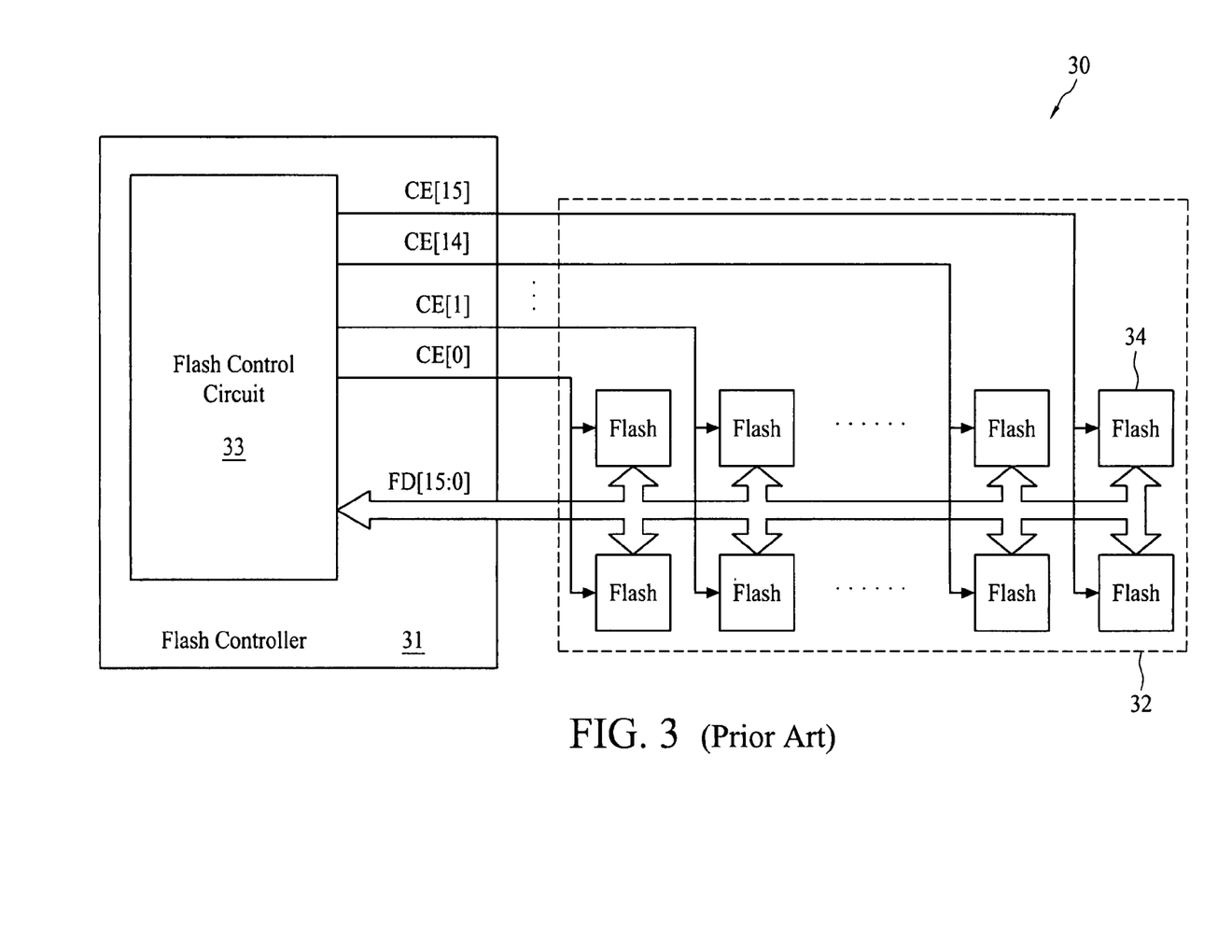

FIG. 3 illustrates a flash memory storage device 30, which is popularly used in current flash memory storage devices or memory card devices, including a flash controller 31 and a flash memory 32. The flash memory 32 has a plurality of flash memory chips 34. The flash controller 31 has a flash control circuit 33 that can issue a plurality of CE signals (CE[0] to CE[15]) to access the flash memory chips 34 of the flash memory 32. A 16-bit flash data bus FD[15:0] is connected between the flash control circuit 33 and the flash memory chips 34.

Figure 4:
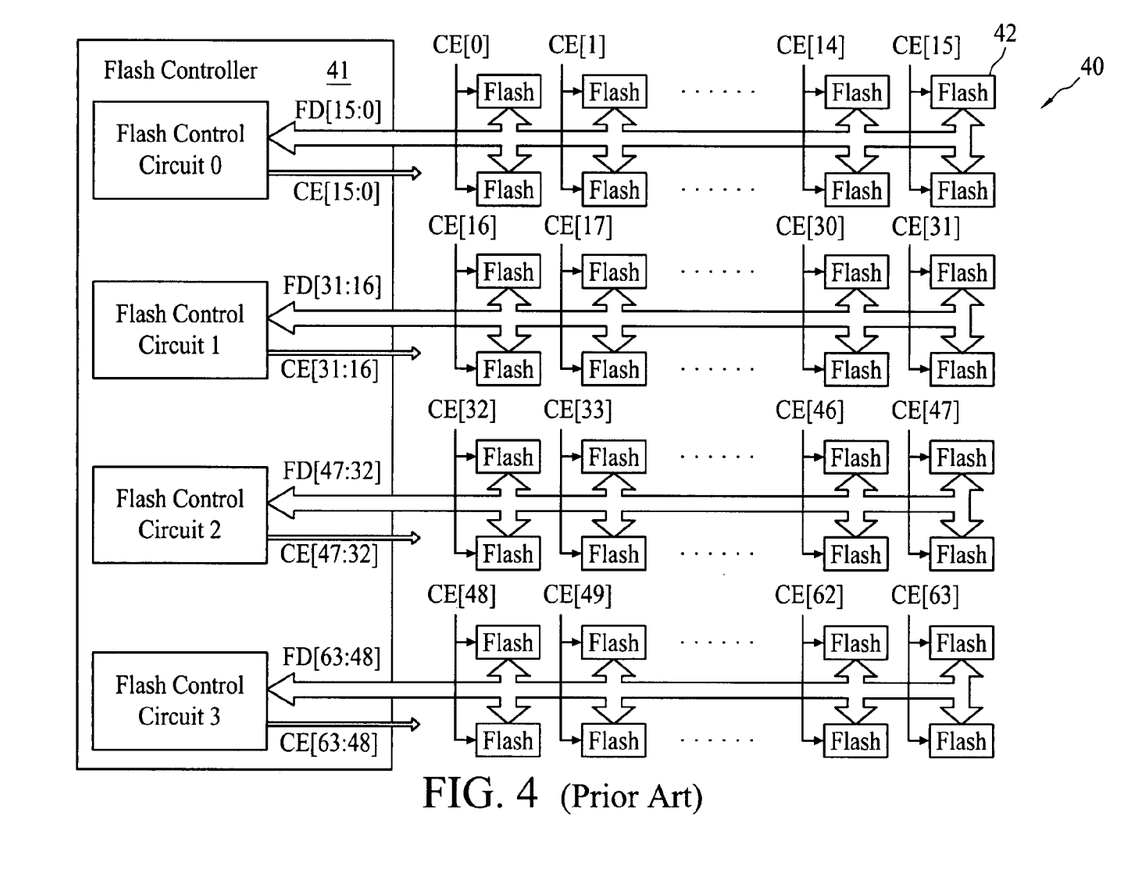

In order to increase the performance of memory storage devices, it is common to increase the number of data buses, resulting in a need for more flash control circuits. As shown in FIG. 4, a flash controller 41 of a flash memory storage device 40 needs 64-bit data bus in total. Four control circuits, i.e., Flash Control Circuit 0, Flash Control Circuit 1, Flash Control Circuit 2 and Flash Control Circuit 3, are used, and each controls a 16-bit data bus. Flash Control Circuit 0 generates CE[15:0] to control the flash memory chips 42 at the first two rows, and FD[15:0] is the data bus between the Flash Control Circuit 0 and the flash memory chips 42. Likewise, Flash Control Circuit 1 generates CE[31:16] to control the flash memory chips 42 at the third and fourth rows, and FD[31:16] is the data bus thereof. Flash Control Circuit 2 generates CE[47:32] to control the flash memory chips 42 at the fifth and sixth rows, and FD[47:32] is the data bus thereof. Flash Control Circuit 3 generates CE[63:48] to control the flash memory chips 42 at the seventh and eighth rows, and FD[63:48] is the data bus thereof. Accordingly, 64 CE pads are needed for the flash controller 41. However, more CE chip pads would increase the package size and cost.

Figure 5:
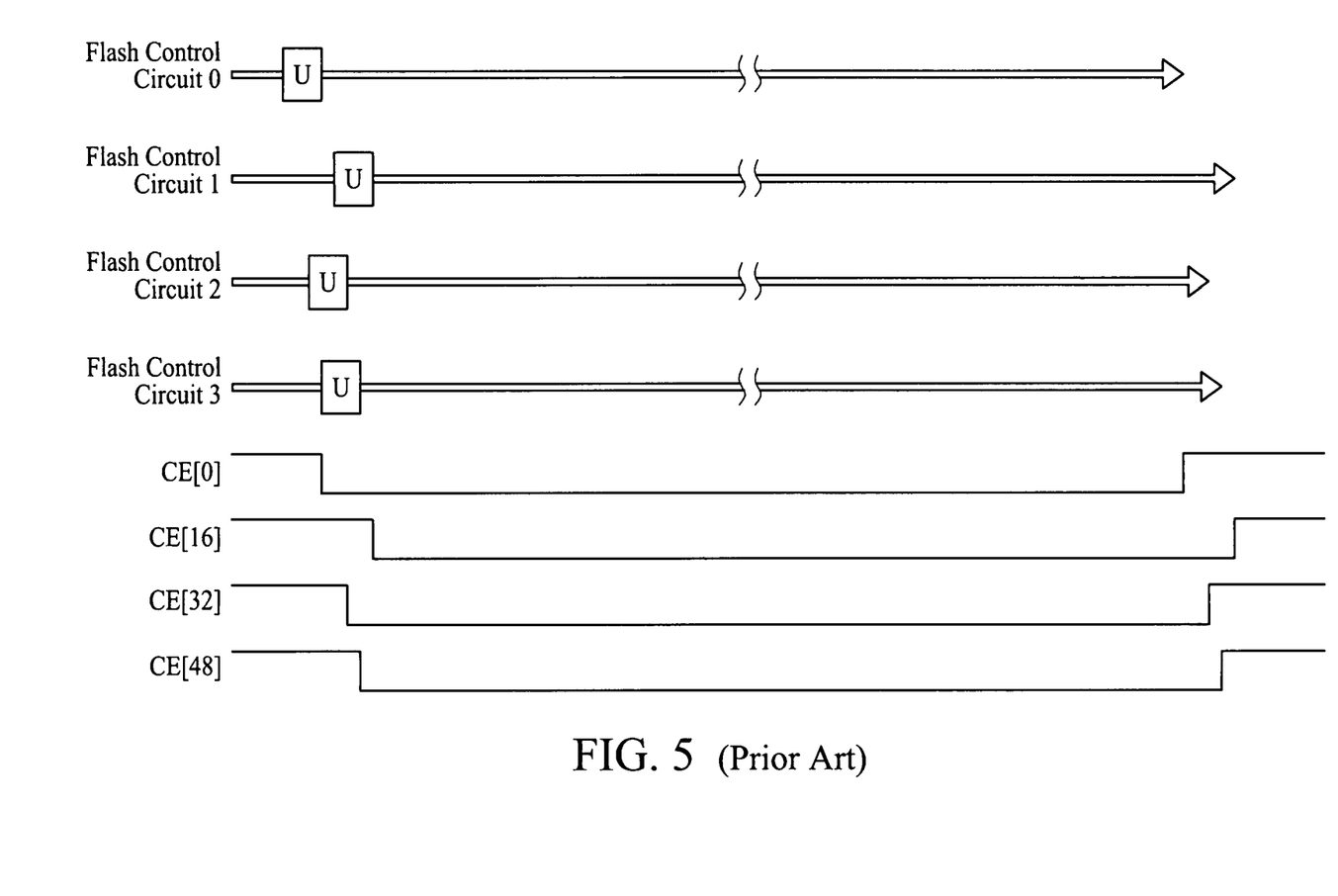
FIGS. 5 to 7 illustrate known operation timing for flash memory storage devices.

FIG. 5 illustrates a timing diagram for the flash memory storage device 40 in FIG. 4. "U" indicates CE update timing, and the CE signals CE[0], CE[16], CE[32] and CE[48], corresponding to the timings "U" for Flash Control Circuit 0, Flash Control Circuit 1, Flash Control Circuit 2 and Flash Control Circuit 3, are changed from "1" to "0" to access the first column of flash memory chips 42, respectively. Then, CE[0], CE[16], CE[32], and CE[48] are changed from "0" to "1" after accessing the first column of flash memory chips 42, respectively.

Figure 6:
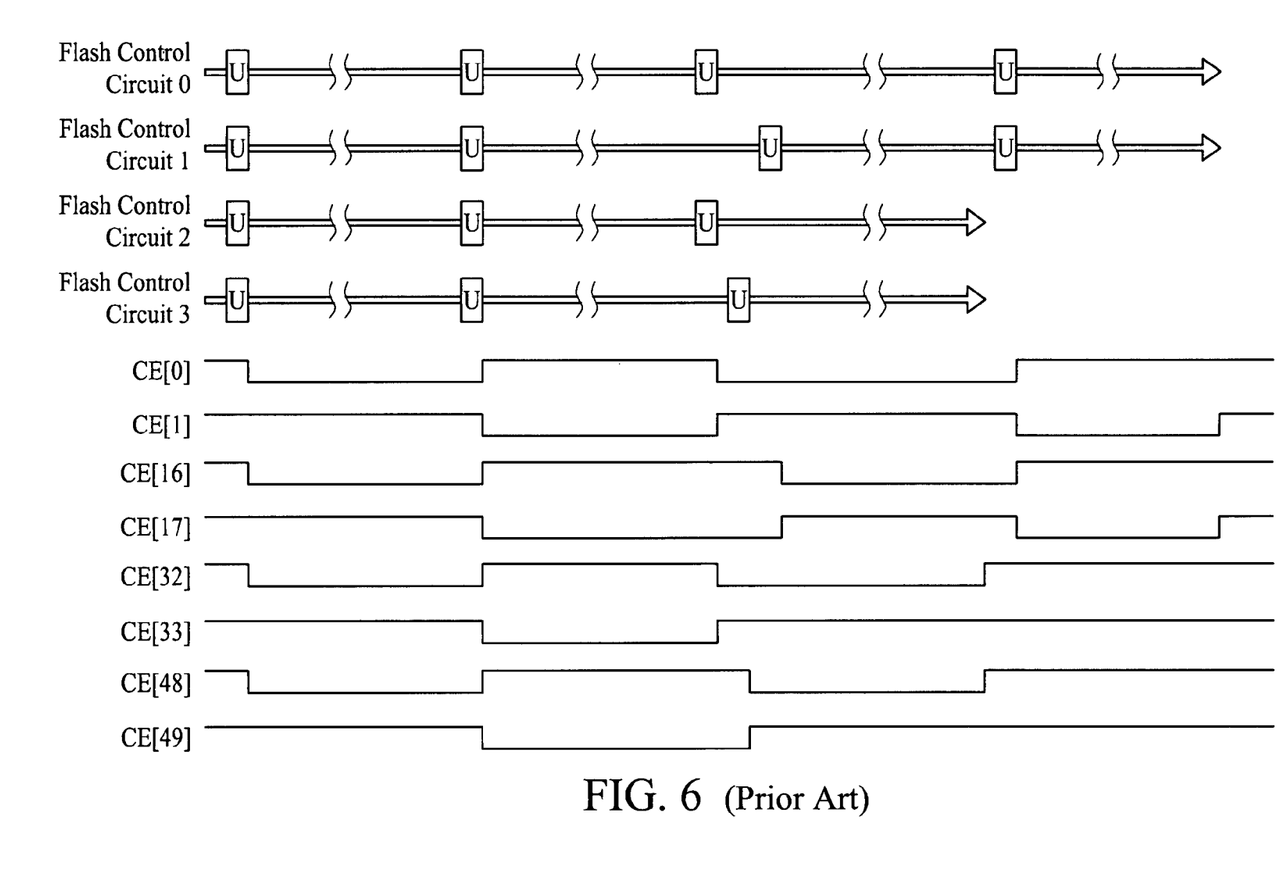

FIG. 6 illustrates a timing diagram of the flash memory storage device 40 in which the operation of every two neighboring columns of flash memory chips are interleaved (so-called interleave-2), i.e., they do not operate at the same time. CE[0] and CE[1], CE[16] and CE[17], CE[32] and CE[33], CE[48] and CE[49] are interleaved, i.e., CE[0] and CE[1] will not be "0" at the same time, CE[16] and CE[17] will not be "0" at the same time, CE[32] and CE[33] will not be "0" at the same time, and CE[48] and CE[49] will not be "0" at the same time. But, CE signals of each flash control circuit work independently, e.g., CE[0] and CE[1] do not care CE[16], CE[17], CE[32], CE[33], CE[48], and CE[49]. In another embodiment, the operation of every four neighboring columns of flash memory chips are interleaved (so-called interleave-4). For instance, CE[0], CE[1], CE[2], and CE[3] are interleaved.

Figure 7:
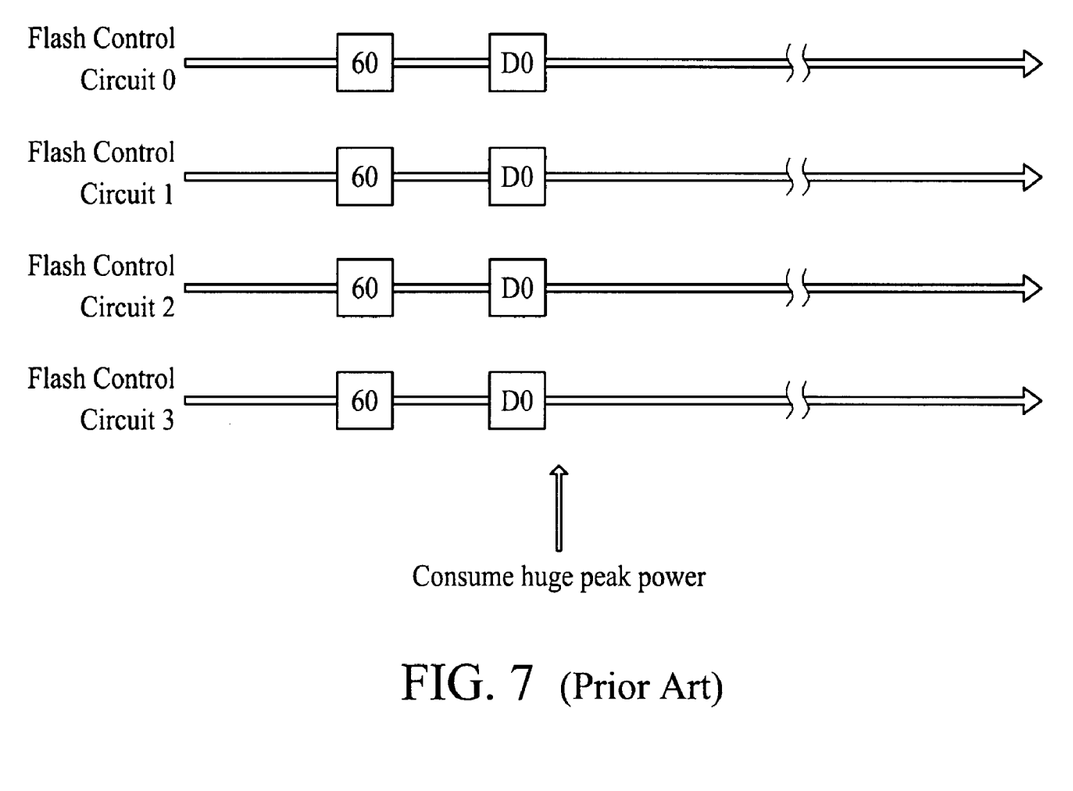

The increase of performance for the flash memory storage devices may incur more power consumption. Peak power demand will grow dramatically when the flash control circuits execute flash commands at the same time. For instance, for the 8-bit memory storage device 10 shown in FIG. 1, the peak current is approximately 125 mA to 133 mA. For the 16-bit memory storage device 20 shown in FIG. 2, the peak current is approximately 230 mA to 239 mA. The memory storage devices 10 and 20 each have only one control circuit, and it can be seen that the peak current will increase tremendously as the number of control circuits increases. As shown in FIG. 7, when the Flash Control Circuit 0, Flash Control Circuit 1, Flash Control Circuit 2 and Flash Control Circuit 3 execute flash commands "60" and "D0" at the same time, a very high peak power consumption occurs at the end of "D0". There is therefore a challenge to reduce the power consumption of the memory device with high performance.

SUMMARY OF THE INVENTION

The present invention provides a non-volatile memory storage device and the operation method thereof to increase performance of the memory storage device and avoid high peak current when executing commands at the same time.

According to the present invention, a non-volatile memory storage device has a non-volatile memory, e.g., a flash memory, and a controller coupled to the non-volatile memory. The controller comprises a plurality of control circuits and an arbitration circuit. Each control circuit is configured to generate a request to update the CE for the non-volatile memory, and the arbitration circuit configured to determine when the requests are acknowledged. The CE for non-volatile memory is updated when all of the requests are received and acknowledged by arbitration circuit.

In brief, requests to update the CE for non-volatile memory are generated by the control circuits, and then the arbitration circuit determines when the requests are acknowledged. The CE for non-volatile memory will be updated when all of the requests are received and acknowledged.

In an embodiment, the arbitration circuit generates acknowledge signals to the control circuits when all of the requests of the control circuits are received by the arbitration circuit.

In another embodiment, the controller further comprises a command interleaving circuit to interleave timings of acknowledging the requests for the control circuits, so as to avoid peak current when executing commands.

DETAILED DESCRIPTION OF THE INVENTION

Embodiments of the present invention will now be described with reference to the accompanying drawings. A flash memory device is exemplified but not limited for non-volatile memory of the present invention below.

Figure 8:
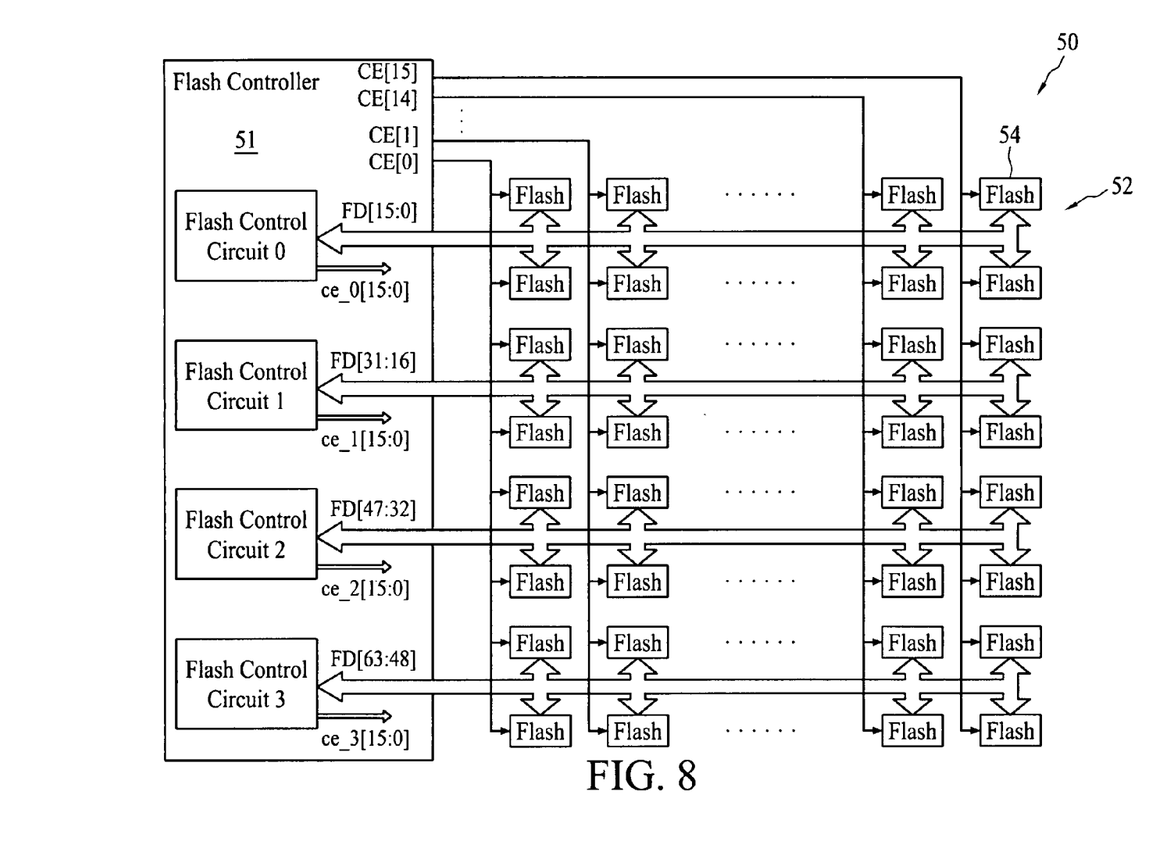
FIGS. 8 to 13 illustrate a memory storage device and the operation method thereof in accordance with an embodiment of the present invention.

FIG. 8 illustrates a 64-bit flash memory storage device 50 having a flash controller 51 and a flash memory 52. The flash memory 52 is a memory array of flash memory chips 54. The flash controller 51 includes Flash Control Circuit 0, Flash Control Circuit 1, Flash Control Circuit 2 and Flash Control Circuit 3. Chip-enable signals CE[0], CE[1], ..., CE[15] each control the flash memory chips 54 of the flash memory 52 in the same column. Flash data bus FD[15:0] is between the Flash Control Circuit 0 and the flash memory chips 54 of the first two rows. Flash data bus FD[31:16] is between the Flash Control Circuit 1 and the flash memory chips 54 of the third and fourth rows. Data bus FD[47:32] is between the Flash Control Circuit 2 and the flash memory chips 54 of the fifth and sixth rows. Data bus FD[63:48] is between the Flash Control Circuit 3 and the flash memory chips 54 of the seventh and eighth rows.

Figure 9:
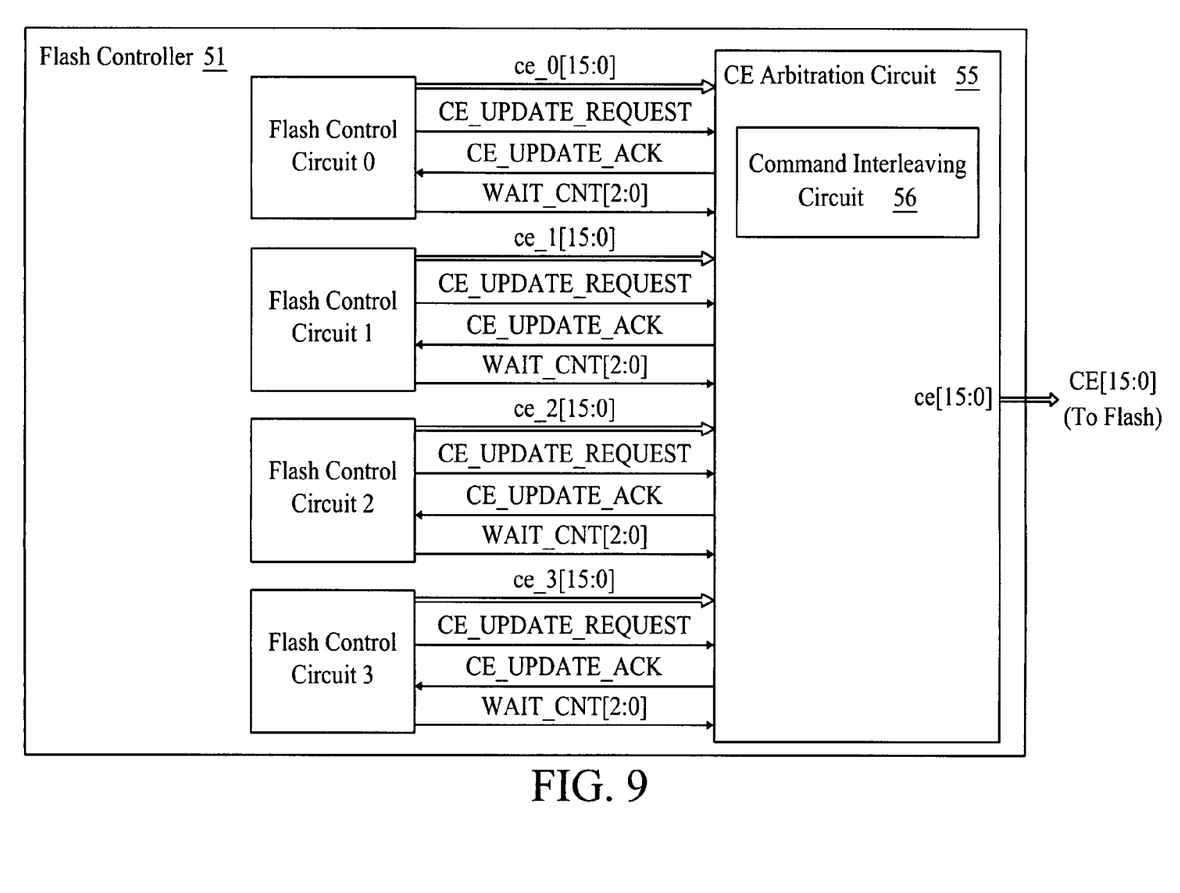

In an embodiment, CE[15:0] transmitted to the flash memory chips 54 is determined by a CE arbitration circuit in the flash controller 51. As shown in FIG. 9, in addition to Flash Control Circuit 0, Flash Control Circuit 1, Flash Control Circuit 2 and Flash Control Circuit 3, the flash controller 51 further comprises a CE arbitration circuit 55. Each flash control circuit transmits a CE_UPDATE_REQUEST signal to the CE arbitration circuit 55, and the CE arbitration circuit 55 acknowledges receipt of the request signal by transmitting a CE_UPDATE_ACK signal to the flash control circuit. After receiving the CE_UPDATE_ACK signal, Flash Control Circuit 0, Flash Control Circuit 1, Flash Control Circuit 2 and Flash Control Circuit 3 transmit chip-enable signals ce_0 [15:0], ce_1 [15:0], ce_2 [15:0] and ce_3 [15:0] to the CE arbitration circuit 55, respectively. Then, the CE arbitration circuit 55 transmits CE[15:0] to the flash memory chips 54.

Figure 10:
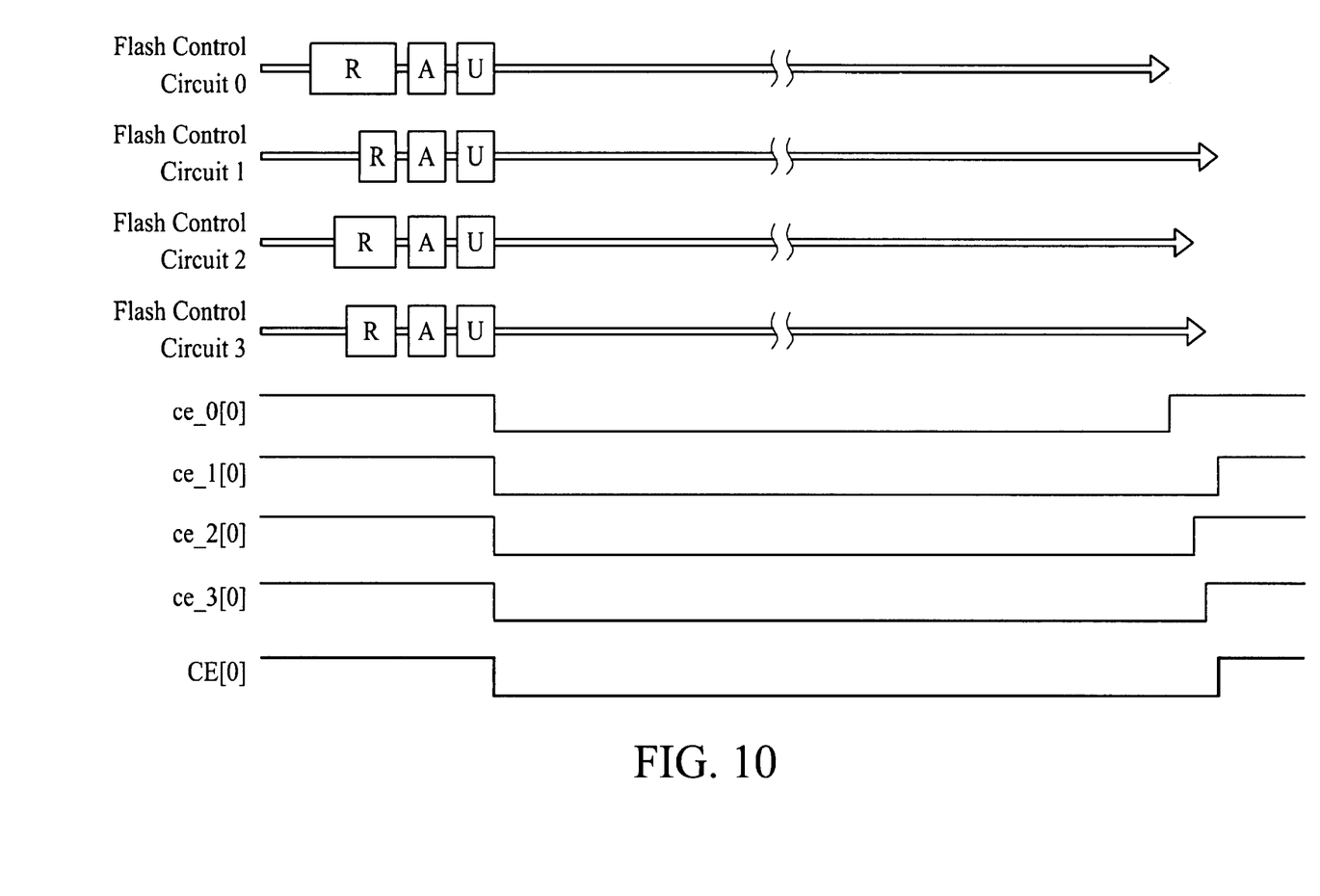
Figure 11:
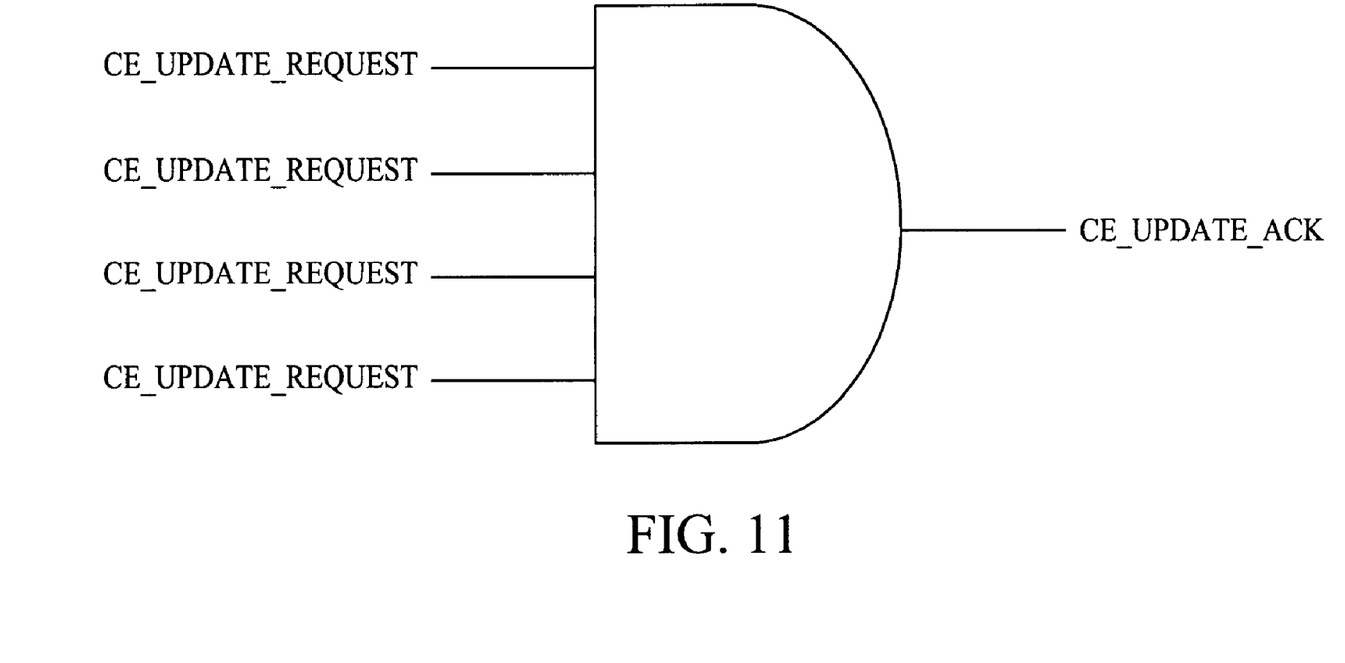

FIG. 10 illustrates an embodiment of the timing diagram for the flash memory storage device 50. Each of the flash control circuits may transmit CE_UPDATE_REQUEST signal denoted by "R" to the CE arbitration circuit, and the CE arbitration circuit will not send acknowledge signals CE_UPDATE_ACK denoted by "A" to the flash control circuits until all CE_UPDATE_REQUEST signals are received. The flash control circuits update chip-enable signals in the "U" to the arbitration circuit after receiving CE_UPDATE_ACK signals, thereby causing ce_0[0], ce_1[0], ce_2[0] and ce_3[0] to switch from "1" to "0" at the same time. In this embodiment, ce_0[0], ce_1[0], ce_2[0], ce_3[0], and CE[0] are changed from "1" to "0" at the same time. The CE_UPDATE_REQUEST signals from the flash control circuits may be transmitted to an AND gate to generate a CE_UPDATE_ACK signal as shown in FIG. 11. CE_UPDATE_ACK will be transmitted to the flash control circuits afterwards.

Figure 12:
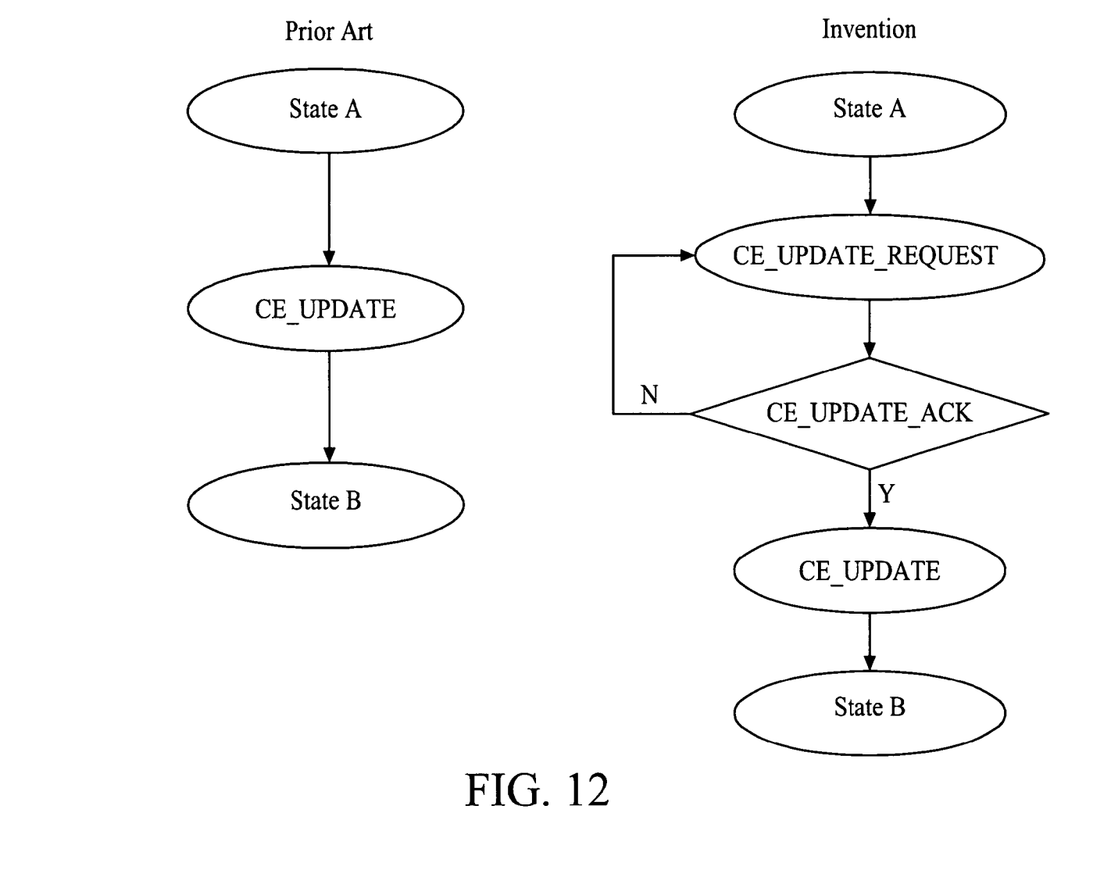

FIG. 12 illustrates CE update procedures in accordance with the prior art and the present invention. For a prior art, in the flash control circuits, CE for flash memory chips will be updated directly from state A, then change to state B after CE signals are updated. According to the present invention, the flash control circuits transmit CE_UPDATE_REQUEST signals to the CE arbitration circuit when it needs to update CE, and CE for flash memory chips can be only updated until the CE arbitration circuit acknowledges CE_UPDATE_ACK signals to the flash control circuit.

Figure 13:
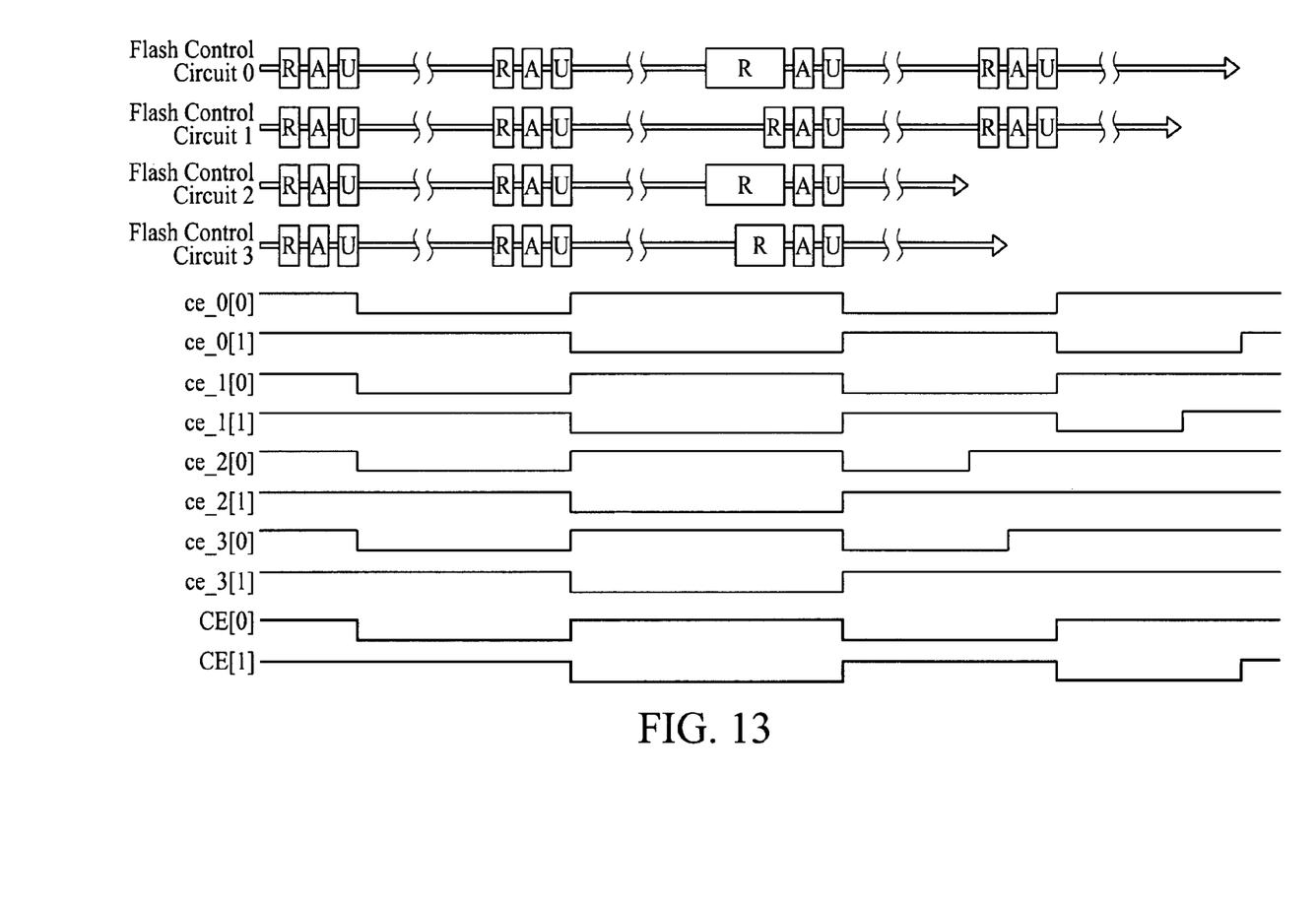

FIG. 13 illustrates a timing diagram for the flash memory storage device 50 in which every two neighboring columns of flash memory chips are interleaved (so-called interleave-2), i.e., they do not operate at the same time. Likewise, each of the flash control circuits may transmit CE_UPDATE_REQUEST signal denoted by "R" to the CE arbitration circuit, and the CE arbitration circuit will send acknowledge signals CE_UPDATE_ACK denoted by "A" to the flash control circuits until all CE_UPDATE_REQUEST signals are received. The flash control circuits change its chip-enable signals denoted by "U" after receiving CE_UPDATE_ACK signals. For ce_0[0] and ce_0[1], ce_1[0] and ce_1[1], ce_2[0] and ce_2[1], ce_3[0] and ce_3[3] corresponding to "U" of Flash Control Circuit 0, Flash Control Circuit 1, Flash Control Circuit 2 and Flash Control Circuit 3, will not be "0" at the same time. CE[0] is logic AND from ce_0[0], ce_1[0], ce_2[0], and ce_3[0]. CE[1] is logic AND from ce_0[1], ce_1[1], ce_2[1], and ce_3[1]. CE[0] and CE[1] will not be "0" at the same time because flash control circuits update its CE signals simultaneously.

Figure 14:
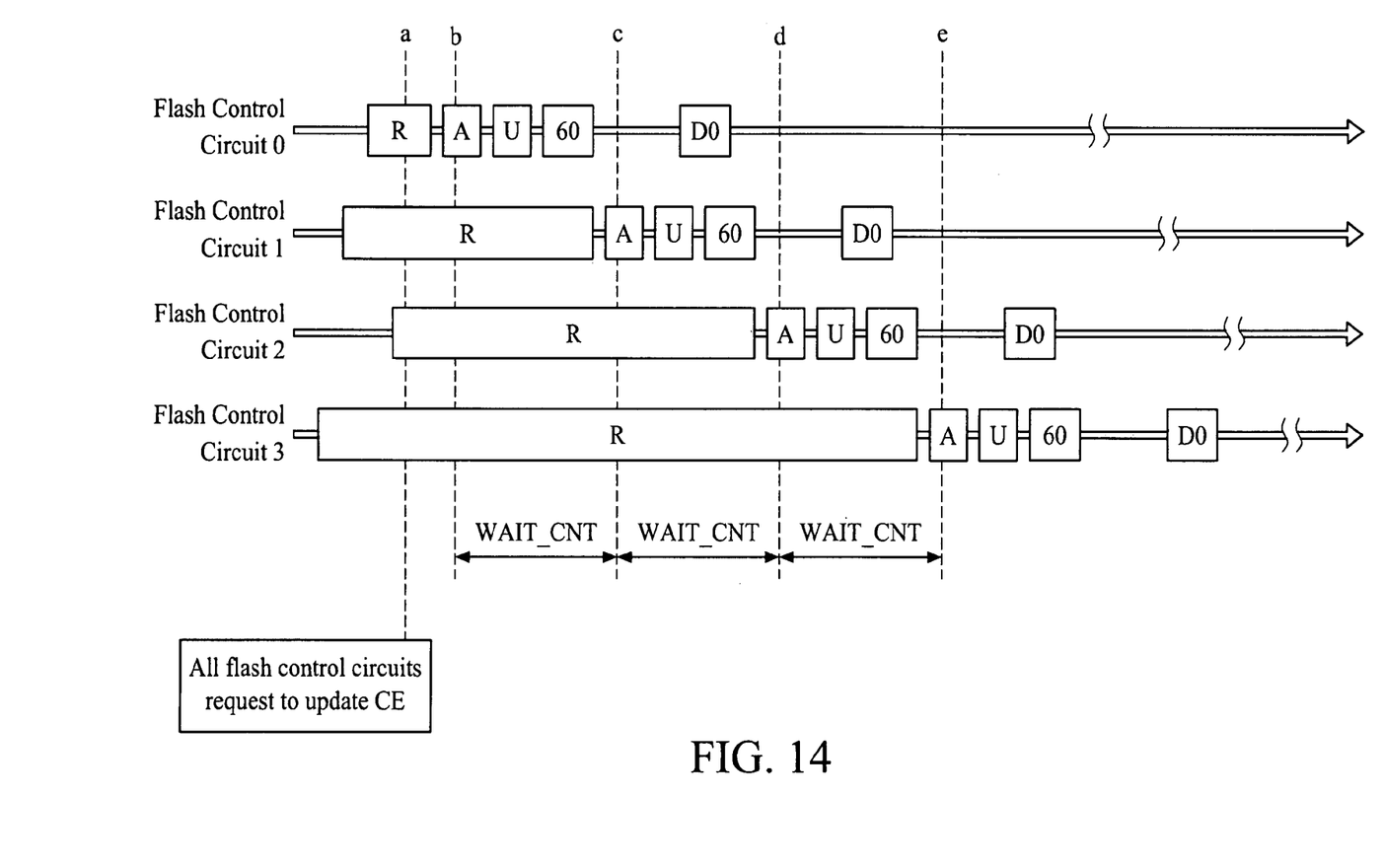
FIGS. 14 to 15 illustrate a memory storage device and the operation method thereof in accordance with another embodiment of the present invention.

The increase of performance for the flash memory storage devices may incur more power consumption. Peak power demand will rise dramatically when the flash control circuits execute flash commands at the same time. According to this invention, the command timings for flash control circuits are interleaved or differentiated to reduce peak current. In FIG. 14, at time "a", all flash control circuits request to update CE, Flash Control Circuit 0 receives an acknowledge signal denoted by "A"; however, Flash Control Circuit 1 receives "A" with an interval of "WAIT_CNT" in comparison with Flash Control Circuit 0. In other words, the generation of acknowledge signal "A" for Flash Control Circuit 1 is postponed with a time period of "WAIT_CNT." Likewise, the generation of acknowledge signals "A" for Flash Control Circuit 2 and Flash Control Circuit 3 are postponed by the time period "WAIT_CNT" in sequence also. Accordingly, the acknowledge signals for Flash Control Circuit 0, Flash Control Circuit 1, Flash Control Circuit 2, Flash Control Circuit 3 are generated at time "b", "c", "d" and "e", respectively, i.e., the timings for acknowledgment for the control circuits are interleaved or differentiated. Therefore, the commands "60" and "D0" will not execute at the same time, thereby reducing the peak power consumption of memory storage device while executing commands. In FIG. 9, the flash controller 51 can also interleave the acknowledgement of receipt of the requests, thereby preventing commands from executing at the same time to overcome the current peak problem. In an embodiment, the CE arbitration circuit 55 may comprise a command interleaving circuit 56 to interleave the timings of acknowledging the requests.

Figure 15:
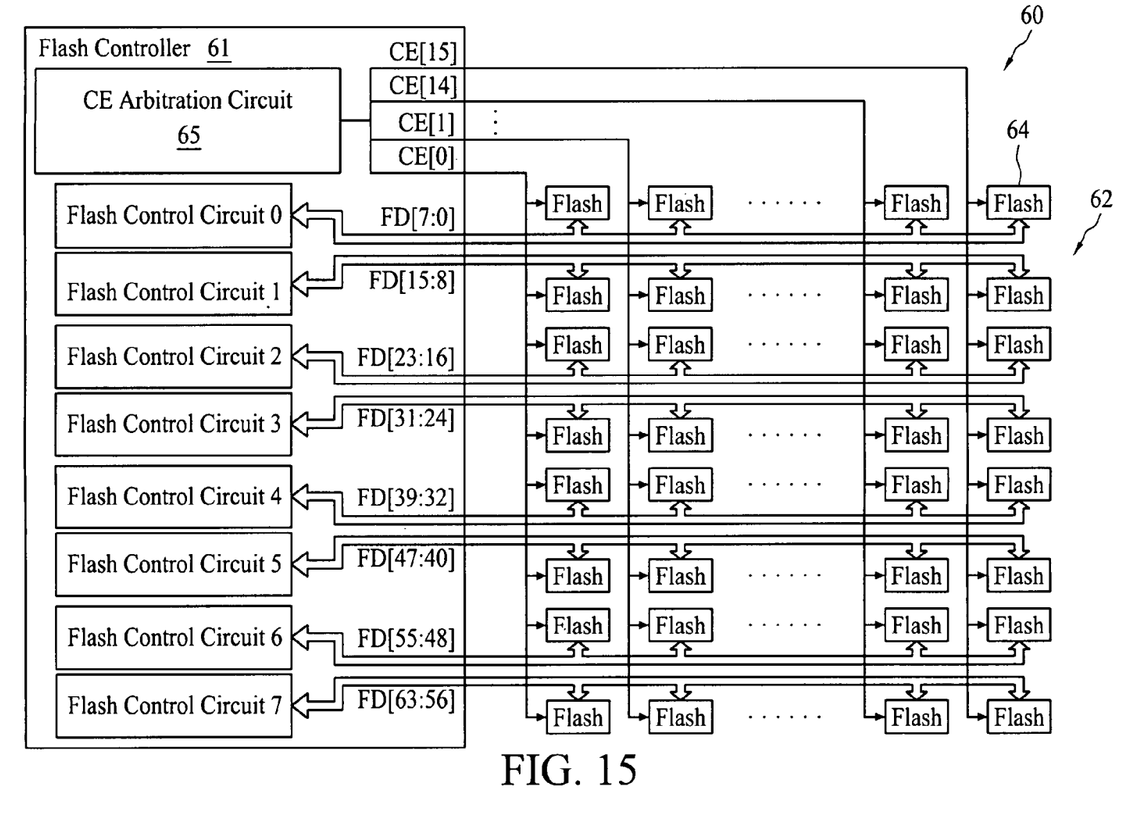

FIG. 15 illustrates another embodiment, a flash memory storage device 60 having a flash controller 61 and a flash memory 62. The flash memory 62 includes a memory array of flash memory chips 64. The flash controller 61 includes Flash Control Circuit 0, Flash Control Circuit 1, Flash Control Circuit 2, Flash Control Circuit 3, Flash Control Circuit 4, Flash Control Circuit 5, Flash Control Circuit 6, and Flash Control Circuit 7. Chip enable signals CE[0], CE[1], ..., CE[15] each control the flash memory chips 64 of the flash memory 62 in the same column. Each flash control circuit has an 8-bit data bus. Flash Control Circuit 0 has data bus FD[7:0]; Flash Control Circuit 1 has data bus F[15:8]; Flash Control Circuit 2 has data bus F[23:16]; Flash Control Circuit 3 has data bus F[31:24]; Flash Control Circuit 4 has data bus F[39:32]; Flash Control Circuit 5 has data bus F[47:40]; Flash Control Circuit 6 has data bus F[55:48]; Flash Control Circuit 7 has data bus F[63:56]. The CE Arbitration Circuit 65 can coordinate CE signals of flash control circuits and interleave the timing of command issue to increase performance and avoid peak current concurrently.

The above-described embodiments of the present invention are intended to be illustrative only. Numerous alternative embodiments may be devised by those skilled in the art without departing from the scope of the following claims.

What is claimed is:

1. A non-volatile memory storage device, comprising:
a non-volatile memory having a plurality of memories; and
a controller coupled to the plurality of memories of the non-volatile memory, comprising:
a plurality of control circuits each being configured to generate a request to update chip-enable (CE) signals for the plurality of memories of the non-volatile memory, wherein each of the chip-enable (CE) signals is sent to at least one of the plurality of memories of the non-volatile memory for enabling the at least one of the memories of the non-volatile memory; and
an arbitration circuit coupled with the plurality of control circuits and configured to determine when the requests transmitted from the plurality of control circuits are acknowledged by interleaving the timing of acknowledge signals sent to the plurality of control circuits;
wherein the plurality of control circuits update the CE signals for the plurality of memories of the non-volatile memory when receiving the acknowledge signals.

2. The non-volatile memory storage device of claim 1, wherein the arbitration circuit generates acknowledge signals to the control circuits when all of the requests of the control circuits are received by the arbitration circuit.

3. The non-volatile memory storage device of claim 2, wherein the arbitration circuit comprises an AND gate that receives the requests from the control circuits.

4. The non-volatile memory storage device of claim 1, wherein the controller generates the CE signals to access the non-volatile memory.

5. The non-volatile memory storage device of claim 4, wherein the non-volatile memory comprises a memory array having memory chips, and each of the CE signals controls a column of the memory chips of the memory array.

6. The non-volatile memory storage device of claim 1, wherein the arbitration circuit further comprises a command interleaving circuit, and the command interleaving circuit is configured to interleave the timings of acknowledging the requests for the control circuits.

7. A non-volatile memory storage device, comprising:
a non-volatile memory having a plurality of memory chips; and
a controller coupled to the plurality of memory chips, comprising:
a plurality of control circuits each being configured to generate a request to update chip-enable (CE) signals for the plurality of memory chips, wherein each of the chip-enable (CE) signals is sent to at least one of the plurality of memory chips of the non-volatile memory for enabling the at least one of the memory chips; and
an arbitration circuit coupled with the plurality of control circuits and configured to send acknowledge signals back to the plurality of control circuits by interleaving the timing of acknowledge signals in response to the requests when the requests transmitted from all of the plurality of control circuits are received by the arbitration circuit;
wherein the plurality of control circuits update the CE signals for the plurality of memory chips when receiving the acknowledge signals.

8. The non-volatile memory storage device of claim 7, wherein the memory chips form a memory array, and each of the CE signals controls a column of the memory chips of the memory array.

9. The non-volatile memory storage device of claim 7, wherein the arbitration circuit comprises an AND gate that receives the requests from the control circuits.

10. An operation method for a non-volatile memory, comprising the steps of:
a plurality of control circuits generating requests to update chip-enable (CE) signals for a plurality of memories of the non-volatile memory, wherein each of the chip-enable (CE) signals is sent to at least one of the plurality of memories of the non-volatile memory for enabling the at least one of the memories of the non-volatile memory; and
an arbitration circuit coupled with the plurality of control circuits and configured to send acknowledge signals back to the plurality of control circuits in response to the requests transmitted from all of the plurality of control circuits are received by the arbitration circuit by interleaving the timing of the acknowledge signals sent to the plurality of control circuits;
wherein the plurality of control circuits update the CE signals for the plurality memories of the non-volatile memory when receiving the acknowledge signals.

11. The operation method for a non-volatile memory of claim 10, wherein the step of determining when the requests are acknowledged comprises generating acknowledge signals when all of the requests of the control circuits are received.

12. The operation method for a non-volatile memory of claim 10, further comprising a step of interleaving timings of acknowledging the requests to interleave the timings of command issue when accessing the non-volatile memory.

* * * * *